US012583776B2

(12) United States Patent
Cox et al.

(10) Patent No.: US 12,583,776 B2
(45) Date of Patent: Mar. 24, 2026

(54) FILTER

(71) Applicant: HYDROLIZE LIMITED, Bristol (GB)

(72) Inventors: Andrew Cox, Stroud (GB); Jack Lee, Bristol (GB)

(73) Assignee: HYDROLIZE LIMITED, Bristol (GB)

( * ) Notice: Subject to any disclaimer, the term of this patent is extended or adjusted under 35 U.S.C. 154(b) by 207 days.

(21) Appl. No.: 17/794,662

(22) PCT Filed: Jan. 25, 2021

(86) PCT No.: PCT/GB2021/050167
§ 371 (c)(1),
(2) Date: Jul. 22, 2022

(87) PCT Pub. No.: WO2021/148820
PCT Pub. Date: Jul. 29, 2021

(65) Prior Publication Data
US 2023/0072694 A1      Mar. 9, 2023

(30) Foreign Application Priority Data

Jan. 24, 2020    (GB) ..................................... 2001039

(51) Int. Cl.
*C02F 3/06* (2023.01)
*C02F 3/00* (2023.01)
*C02F 3/34* (2023.01)
(52) U.S. Cl.
CPC ................ *C02F 3/06* (2013.01); *C02F 3/341* (2013.01); *C02F 2003/001* (2013.01)
(58) Field of Classification Search
CPC ...... C02F 3/06; C02F 3/341; C02F 2003/001;

C02F 3/104; C02F 3/107; C02F 3/34; C02F 2103/42; C02F 2209/03; C02F 2209/14; C02F 2209/18; C02F 2209/40; C02F 2301/066; C02F 2303/16; C02F 2303/24;

(Continued)

(56) References Cited

U.S. PATENT DOCUMENTS 4,279,756 A * 7/1981 Weiss ..................... B01J 20/045
210/695
4,322,296 A * 3/1982 Fan ......................... C12M 25/18
210/903

(Continued)

FOREIGN PATENT DOCUMENTS

JP        H02284694 A      11/1990
JP        H1066656 A      3/1998

(Continued)

OTHER PUBLICATIONS

Translation of Kawase (JPH02284694A) (Year: 1990).*

(Continued)

*Primary Examiner* — Ekandra S. Miller-Cruz
(74) *Attorney, Agent, or Firm* — Dinsmore & Shohl LLP

(57) ABSTRACT

A filter system and filter suitable for water treatment includes a filter having a housing with a water inlet and an outlet, the housing defining a filtration chamber therein. The filtration chamber has filter media therein having a plurality of at least partially porous filtration beads and a pump for pumping water to the inlet. Such a filtration system enables high nutrient removal thus minimising the food source for algae.

12 Claims, 3 Drawing Sheets

(58) Field of Classification Search
CPC .. C02F 2305/06; C02F 1/32; C02F 2101/105;
Y02W 10/10; B01D 24/36
USPC ........................................................ 210/620
See application file for complete search history.

(56) References Cited

U.S. PATENT DOCUMENTS

| | | | | |
|---|---|---|---|---|
| 4,765,833 | A | * | 8/1988 | Narumiya .......... B01D 39/2093 |
| | | | | 75/412 |
| 5,045,207 | A | * | 9/1991 | Fecondini ................ G01N 1/34 |
| | | | | 210/652 |
| 5,126,048 | A | * | 6/1992 | Zhang ........................ C02F 1/44 |
| | | | | 210/511 |
| 5,310,486 | A | | 5/1994 | Green et al. |
| 5,486,292 | A | * | 1/1996 | Bair ......................... C02F 1/283 |
| | | | | 210/150 |
| 5,723,043 | A | | 3/1998 | Hawk et al. |
| 5,897,784 | A | | 4/1999 | Mills |
| 8,366,936 | B1 | * | 2/2013 | Jones ...................... C02F 1/288 |
| | | | | 210/663 |
| 2011/0127216 | A1 | | 6/2011 | Petrich |
| 2015/0329396 | A1 | | 11/2015 | Presby |

FOREIGN PATENT DOCUMENTS

| | | | |
|---|---|---|---|
| JP | 2002220291 | A | 8/2002 |
| KR | 20090117547 | A | 11/2009 |
| KR | 100980464 | B1 | 9/2010 |
| KR | 20160125188 | A | 10/2016 |
| WO | 03014030 | A1 | 2/2003 |

OTHER PUBLICATIONS

International Search Report dated Apr. 9, 2021; International Application PCT/GB2021/050167.
"Aquatic Science launches VITII, the 100% natural and ecological swimming pool," Monbassin, published Dec. 5, 2019, https://www.monbassin.com/aquatic-science-lance-vitii-la-piscine-100-naturelle-et-ecologique/, accessed Feb. 9, 2026.
Chapters 6, 7, and 26: "Swimming Ponds," in Swimming Pool Water—Treatment and quality standards for pools and spas, Pool Water Treatment Advisory Group (PWTAG), 3rd Edition, pp. 62-65, 69-76, and 225-227, Jan. 1, 2017.
Product webpage for "Finest-Filters 1000g (1kg) Ceramic Filter Rings Biological Filter Media in Bags for Aquarium/Pond Filters," Amazon, Jan. 12, 2013, https://www.amazon.co.uk/Finest-Filters.Ceramic-Biological-Aquarium-Filters/dp/B00BODIPVM?source=ps-sl-shoppingads.lpcontext&ref =fplfs&psc=1 &smid=AVOWDM2FFQCUE.

* cited by examiner

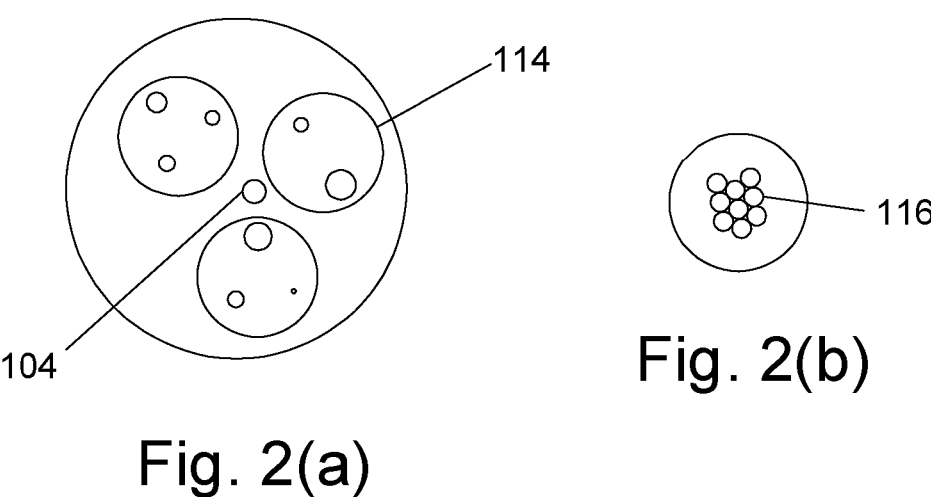
Fig. 2(b)
Fig. 2(a)
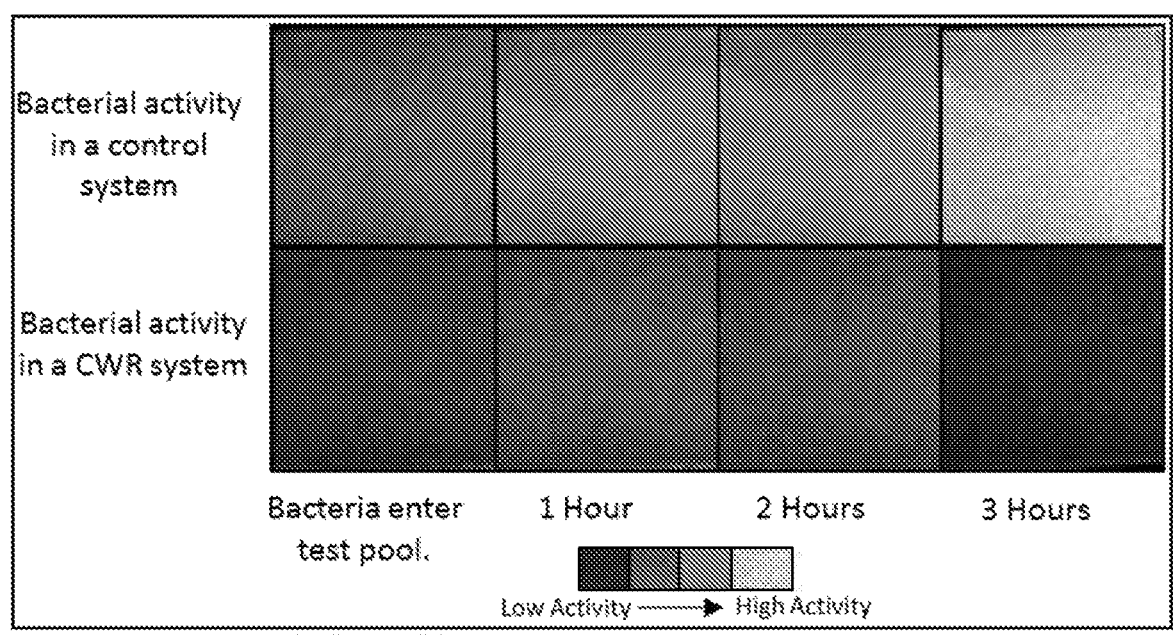
Fig. 4: Light report of pathogen removal in a filter of the present invention using a bioluminescent bacteria *E. coli.*
Fig. 3

FILTER

CROSS-REFERENCE TO RELATED APPLICATIONS

This application is the U.S. National Stage of PCT/GB2021/050167 filed on Jan. 25, 2021, which claims priority to United Kingdom Patent Application 2001039.3 filed on Jan. 24, 2020, the entire content of both are incorporated herein by reference in their entirety.

FIELD OF THE INVENTION

The present invention is a filtration system and filter suitable for water treatment, where the water to be treated may be intended for use as drinking water or may alternatively be used in a water system such as a swimming pool water treatment system.

BACKGROUND OF THE INVENTION

Phosphates are compounds of the nonmetallic element phosphorous and are a primary food source for all life forms, including all types of algae and other microorganisms. Complex phosphate compounds are broken down into their simplest form, orthophosphates, by either oxidation (converting compounds into oxides), hydrolysis (decomposition by water) or enzymatic digestion. Regardless of how it happens, if phosphates are allowed to remain present in water, including but not limited to pool, spa, or pond water, they will be reduced to orthophosphates, which are a form of phosphates that algae and pathogens can readily uptake and utilise. If this happens, then algae or pathogen growth is accelerated potentially, leading to an algal bloom or high pathogenic loadings.

The challenge with phosphates is that they are constantly being introduced into water. With respect to swimming pool water, for example, they are found in mains tap water, lawn and garden fertilizers, decaying vegetation, rain, dust, cosmetic items on bathers, organic matter on bathers; skin sweat urine faecal matter and even other pool chemicals. This means a fresh batch of phosphates risk entering the water when any of the following occur: the wind blows dirt into pool; sprinkler run off from the lawn enters the pool, the pool water leveller inputs fresh mains water; leaves or twigs enters the water; someone swims in the water, tap water tops up the pool water and certain chemicals containing any amount of phosphoric, phosphonic or other phosphorous based ingredients are dosed into the pool.

Accordingly, phosphates can never be completely removed from entering the water. Instead, a basic mechanism for phosphate management, is to limit the risk of entry of phosphates into the pool as far as possible through for example regular maintenance by removing organic detritus and washing before bathing. However, this is insufficient to prevent phosphates in the water and accordingly to prevent significant algae growth and/or proliferation of pathogens. The second commonly used approach is to provide a filtration step comprising a particulate filter through which water flows to remove the majority of suspended solids. This removes larger phosphate containing debris but generally leaves some behind and those that do get removed chemically break down over time, releasing phosphate, unless they are physically removed from the filter (e.g., by backwashing). The third approach used in combination with other approaches is to maintain high water recirculation rates and pool turnover times, which in combination with the second approach, has a detrimental effect upon the ability for algae to grow by reducing the residence time of nutrients in the main water body. Whilst these approaches to reduce phosphates in the water have an effect, they are insufficient to prevent significant growth of biological films, pathogens or aquatic algae, without the use of disinfects (e.g., chlorine).

The well known and used approach to minimising algae and pathogens in water systems, particularly those such as swimming pool systems, is to control the pathogens and algae directly using cell destroying chemicals. Chemical disinfectants, such as chlorine, are well known additives typically in the range of 0.2-3 ppm. Chlorine acts to kill both algae and other pathogens such as viruses, bacteria and protozoa. However, introduction of chlorine levels into swimming pool water at 3 ppm is six times higher than regulations allow in the UK for tap water, meaning the effects on users is damage to human health, especially when choline by-products are generated. Typical experiences for users are skin irritations, stinging eyes and unpleasant smells. By-products from chemicals include trihalomethanes (THMs), which are scientifically proven to damage human health.

SUMMARY OF THE INVENTION

The present invention addresses the abovementioned problem of introduction of relatively high disinfectant levels into water, for example swimming pool water, or at least provides a useful, more energy efficient alternative to controlling algae and pathogens According to the present invention there is a water filtration system comprising:

a filter comprising a housing having a water inlet and an outlet, the housing defining a filtration chamber therein, the filtration chamber having filter media therein comprising a plurality of at least partially porous filtration beads; and a pump for pumping water to the inlet.

The present invention enables high nutrient (predominantly phosphate, but also nitrogen and carbon) removal capability thereby minimising the food source of the algae via microbial absorption, and metabolism, of nutrients into bacteria that will naturally grow on the surfaces presented by the porous filtration beads. This in turn therefore reduces the ability for growth of algae (via nutrient starvation) and achieves this without requiring addition of chemical disinfection. The bacteria also control pathogens in the water as demonstrated in the experimental data by virtue of nutrient reduction by both predation and nutrient control.

By providing a pump for pumping water into and through a sealed filtration chamber with the defined filtration media the effectiveness of the filter can maximised. Thus flow control enables the hydraulic loading to be modified meaning the contact time of the water with the beads can be carefully controlled for optimal removal of pathogens or nutrients. Furthermore, the pump can reverse flow direction thereby allowing backwashing of the filter media.

A sealed flow path is preferably defined between the pump and the filtration chamber.

It will be appreciated that for certain applications a plurality of filters (preferably biofilters) may be provided in the water filtration system, either in series or in parallel.

The inlet comprises an inlet port, wherein the inlet port is coupled to the pump. Coupling is preferably achieved by a coupling arrangement. The outlet preferably comprises an outlet port.

The pump is beneficially controllable to control flow rate of water through the filter. The pump is preferably arranged such that water flow direction can be reversed in order to effect backwashing of the filter media to a separate waste line.

The system may comprise a dosing arrangement for dosing suitable nutrients into the water. This can be beneficial for certain applications such as home indoor swimming pools where the nutrient source (e.g, from bathers) can be minimal over an extended time frame if the pool is not used or where the addition of such nutrients into the filter increases microbial action such that overall nutrient levels in the water body are reduced. Whilst this is beneficial in that there is no food source for the algae, there is also no food source for the beneficial bacteria in the biofilter. Accordingly, means to monitor the phosphate and nitrogen levels in the water (such as a using a colorimeter photometer, for example) may be provided, and in the event the nutrient level is too low the dosing arrangement may dose nutrients (typically nitrogen in the form of ammonia) into the water.

In the instance of water filtration or remediation, the system may comprise a dosing arrangement for dosing suitable live bacterial cultures into the filter such that the microbial community on the media can be controlled and optimised for contaminant removal (pathogens, nutrients and or heavy metals/chemicals).

The system may further comprise a UV light source for further control of pathogens in the water.

The system may further comprise an oxygenator for oxygenating the water. This optimises biofilm health within the filter, especially in a pool system when the water is heated to high temperatures (over 25 deg C.) or the pool is covered for long periods of time.

The present invention also extends to a filter (preferably a water filter) comprising a housing having a water inlet and an outlet, the housing defining a filtration chamber therein, the filtration chamber having filter media therein comprising a plurality of at least partially porous filtration beads. The following statements are preferred features of the filter.

The filter is beneficially a pressure filter. This enables full control of the amount of water to be treated by the filter per day, in order that nutrient removal is optimised and residence time of nutrients in the water is minimised. A pressure filter is a sealed vessel that can operate up to 5 BAR. The housing of the filter may comprise a variety of dimensions. As an example, the housing for a 90 m³ pool may be a 750 mm diameter by 1000 mm height cylinder. The volume of the filtration media may typically comprise between 309-850 litres depending on pool volume. In one embodiment the filter is a swimming pool filter.

The inlet and outlet are positioned spaced apart such that water flowing through the inlet is directed across the filtration beads in a top to bottom flow rate direction. In use the inlet is preferably positioned higher than the outlet. The inlet is preferably positioned toward an upper end of the housing and the outlet is preferably positioned toward a lower end of the housing. The outlet is preferably positioned at a lowermost location of the filter chamber.

The plurality of beads are optimised to support a bacterial community and therefor are each preferably porous through the entire bead consequently allowing bacteria to colonise the entire bead. The beads are also preferably hydrophilic. Such a structure provides structural integrity whilst maximising the surface area for beneficial bacteria to inhabit and maximises the contact area for the water flow. The beads are preferably substantially spherical. This further maximises the surface area of the beads meaning that the effectiveness of microbial action and removal of nutrients, and aquatic pathogens, is optimised; higher surface areas means higher bacterial cell numbers within the filter. The beads preferably have a dry average material density of 0.1 to 1.2 kg/litre, and even more preferably 0.2 to 0.5 kg/litre, and substantially 0.35 kg/litre. The relatively low density means that the backwash water pressure used to clean the beads can be reduced due to the natural positive buoyancy of the beads. The beads themselves however will not float due to their inherent porosity, but will readily become agitated, and the filter bed becomes semi-fluidised, during the backwash process.

An important advantage of the density and thus relative buoyancy of the beads allows air to be introduced during the backwash/cleaning phase, semi-fluidising/lifting the bed, which would otherwise be difficult. This air scour step further improves the cleaning procedure and maximises the trapped nutrient removal from the beads during the backwash phase.

To further increase surface area/packing density, the beads preferably comprise a diameter of between 10-30 mm and even more preferably between 15-25 mm. The beads preferably have a diameter tolerance of +/−2 mm.

The beads are preferably ceramic, which has been found to provide improved adhesion for bacteria when used as a biofilter (e.g., in comparison to plastic-based media) This feature means the healthy biofilm/biofilter remains on the beads during the backwash phase, preventing biofilter loss.

The ceramic beads can be engineered with very high specific surface areas and specific pore sizes and distribution to optimise microbial habitation and volume, thus increasing filter efficiency.

The chamber is preferably defined by chamber walls, and the beads are preferably unconstrained in the chamber. This means that the beads are able to readily move (fluidise) and rearrange their relative positions during a reverse flow backwash cycle thereby improving the ability to effectively clean the beads. This is an imperative step to removing the phosphate and nitrogen from the system.

The ability to easily backwash the filter media is a significant benefit of the present invention as significant time and energy costs can be reduced due to the fact they move in the chamber resulting from density and thus relative buoyancy, especially in combination with air scouring.

Air scouring is significantly more effective at cleaning the media in comparison to water alone. The ability to air scour and semi-fluidise the filter also reduces water loss during the backwash process. Air scouring has the following advantages over simple reverse flow traditionally used in filter backwash:

1—Better cleaning of filter media (microbubbles lift off dirt better than water alone)

2—Lower backwash speed (smaller pumps and less water wastage)

3—Automation/prevention of filter clogging triggered by flow reduction or pressure increase.

The filter media preferably comprises primary filter media, and the filter chamber preferably further comprises a plurality of secondary filter media different to the primary filter media. The primary filter media are preferably substantially the same within tolerances. The secondary filter media preferably comprises a plurality of substantially non-porous filtration media. This second class of filter media are preferably provided to act as a particulate filter thereby trapping particulate matter that is present in the water (known as a mechanical sieve). This trapped matter is held until the filter is backwashed (flow is reversed) or air scoured, and which time the particulate matter rises to the surface of the water in the filter and can be mechanically removed (i.e., pumped to waste). Such secondary filter media can beneficially trap particulate material as small as 2-10 microns. In the time between backwashes, the trapped particulate matter is also utilised by the bacterial population within the primary filter media.

The secondary filter media preferably comprise a silicate. The silicate may comprise glass.

Environment Glass Filter Media (EGFM) is an example of a suitable material for the secondary filter media and may comprise a blend of silicates manufactured by fusion of quartz sand, limestone, soda ash and recycled glass. The silicate may contain metal oxide catalysts that dissociate oxygen and water to create a zone of high oxidation potential and thereby prevent bacteria growth. The secondary filter media is preferably antimicrobial. A commercially available and suitable secondary filter media may be Activated Filter Media (AFM). The antimicrobial properties of AFM help reduce biofouling comprising growth of unwanted microorganisms on a surface of the filter media. Biofouling causes the media to "gel" together and reduces filter efficiency.

The primary and secondary filter media may be segregated from each other in the chamber. This saves space and removes the requirement for a separate mechanical sieve filter. The secondary beads preferably have a negative buoyancy, meaning they sink in water. The density of the secondary beads is greater than the primary filter media and may have a density greater than 1 kg/litre.

In an alternative embodiment, there is a porous barrier between the primary and secondary filter media which has the effect of preventing mixing of the primary and secondary filter media. The flow direction may be either into the primary or second media first depending on the water to be treated, where dirtier water should be input to the secondary filter media first.

The secondary filter media preferably has a maximum dimension of 0.2-1.5 mm and even more preferably between 0.8-1.0 mm. It is beneficial that the secondary filter media has a size gradient between 0.2 mm and 1.5 mm. The combination of smaller to larger secondary filter media improves particle separation. This reduces clogging and therefore increases mechanical filtration efficiency It will be appreciated that due to the difference in densities, the primary and second filter media do not generally mix in the chamber, and the primary filter media sits above the secondary filter media.

In an embodiment, the water filtration system further comprises a second filter in fluid communication with the first filter, the second filter comprising a further housing having a water inlet and an outlet, the further housing defining a further filtration chamber therein, wherein the filter media in the first filtration chamber comprises primary filter media, and the secondary filter chamber further comprises a plurality of secondary filter media different to the primary filter media. Thus, the first and second filter media are provided in separate filter chambers. The order of the first and second filter with the different filter media therein may be order appropriate to the water to be treated. For example, in very dirty water, the second filter may be positioned upstream of the first filter.

The provision of the primary and secondary filter media ensures that both phosphate levels, pathogen and particulate levels in the water are controlled, firstly via microbial absorption and secondly by mechanical filtration.

The water filtration system may comprise a monitoring system such as a water flow rate and/or pressure sensor for monitoring the water pressure and/or flow rate and control one or more operational parameters based on the output from the monitoring system. The operational parameter controlled may comprise the water flow rate through modifying the pump speed. Alternatively the operational parameter may be to trigger a backwash operation for example in the event the pressure has increased to a predetermined value.

The filter is preferably a biofilter. The beads are preferably at least partially coated with a bacterial culture. Given water movement over the filter, a suitable bacterial community will become established naturally within the filter. To expedite this process, or to re-seed an underperforming biofilter, a suitable bacterial culture, which is commercially available and comprises a pre-established nitrifying bacteria community can be used. A suitable bacterial culture is commercially available and comprises a pre-established nitrifying bacteria community (widely available, for example Biological Preparations Limited, Beaufort Studio, Atlantic Wharf, Cardiff, CF10 4AH).

Also according to the present invention there is a method of water filtration comprising:

providing a filter comprising a housing having a water inlet and an outlet, the housing defining a filtration chamber therein, the filtration chamber having filter media therein comprising a plurality of at least partially porous filtration beads;

pumping water to be filtered through the filtration chamber.

The pumped water passing through the filter is therefore pressurised.

The method may comprise the step of dosing the beads with bacterial culture. The dosing step may be a step to seed the bacterial culture or may be dosed at multiple intervals to change the concentration of bacteria.

The method may comprise the step of feeding the bacterial culture with nutrients.

BRIEF DESCRIPTION OF THE DRAWINGS

The present invention will now be described by way of example only with reference to the accompanying drawings where:

FIGS. 2a and b are schematic representations of filter media according to an illustrative embodiment of the present invention;

FIG. 3 is a representation showing the process pathogens go through comparing a control system with the present invention, where *Escherichia coli* was modified to emit light, seeded in the filter and the time taken for the filter to consume the modified bacteria was measured.

DETAILED DESCRIPTION OF THE INVENTION

Graphs 1-4 are test results showing the effect of the method and system according to the present invention on various pathogens.

Figure 1:
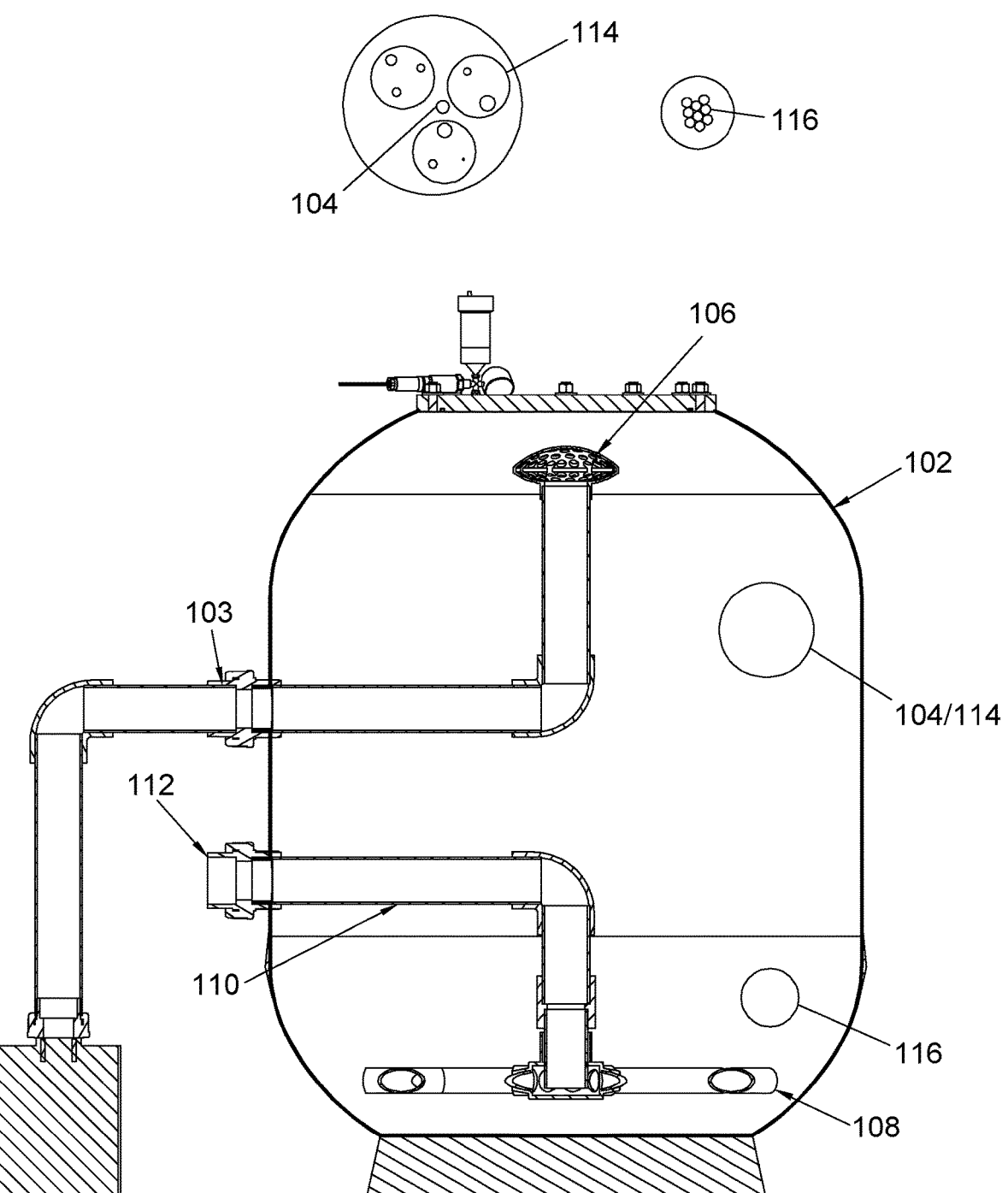
FIG. 1 is a schematic cross-sectional representation of a filter according to an illustrative embodiment of the present invention.

Referring to FIG. 1 presented is a housing 102 defining a filtration chamber 104 therein. The housing 102 comprises a connector 103 and a pathway 104 extending from the connector 103 to an inlet 106 provided at the upper end of the filtration chamber 104 for releasing water into contact with the filter media. A water collector 108 in the form of an outlet is positioned at the lower end of the filtration chamber 104 for collecting water that has passed through the filter media which in turn transfers the water through pathway 110 and out through a second connector 112. A pump 105 is connected to the inlet 106. This means that the flowpath between the pump and the chamber is sealed, meaning the filter can be termed a pressure filter.

Provided within the filtration chamber 104 is filter media comprising a plurality porous filtration beads 114. The generally spherical beads 114 themselves are schematically presented in FIG. 2a and are porous through the entire bead. Such a structure provides structural integrity whilst maximising the surface area for bacteria to inhabit and maximises the contact area for the water flow. This further maximises the surface area of the beads. The beads have a dry density of approximately 0.35 kg/litre. The relatively low density means that the backwash water pressure (which is when the flow direction is reversed in order to clean the beads and remove solid matter from the filter) is reduced due to the natural positive buoyancy of the beads. The beads 114 themselves however will not float due to their inherent porosity but will readily become agitated during the back-wash process. The beads 114 comprise a diameter of between 15-25 mm with a diameter tolerance of +/−2 mm. The beads 114 are preferably ceramic which has been found to provide improved adhesion for bacteria when used as a biofilter.

The beads are unconstrained in the chamber. This means that the beads are able to readily move and rearrange their relative positions during a backwash cycle thereby improving the ability to effectively clean the beads. During a backwash cycle when the flow direction is reversed a valve (not shown) is closed to prevent water exiting through the inlet 103 and dirty water exits the chamber 104 from an upper end of the housing 102, controlled by another valve (not shown). During a backwash cycle air is forced through the filter media. By tailoring the properties of the filter media the effectiveness of this cycle can be maximised to remove nutrients and energy usage minimised.

Provided within the filter chamber 104 are a plurality of secondary filter media 116 also schematically represented in FIG. 2b. The secondary filter media comprises a plurality of substantially non-porous filtration media. There is no seg-regation between the primary and secondary filter media.

The secondary filter media comprises a silicate such as glass and is not porous.

The primary and secondary filter media are beneficially not segregated from each other in the chamber. The second-ary beads preferably have a negative buoyancy, meaning they sink in water. The density of the secondary beads is greater than 1 kg/litre. The secondary filter media 116 has a maximum dimension of between 0.8-1.0 mm. It is beneficial that the secondary filter media has a size gradient between 0.2 mm and 1.5 mm. The combination of smaller to larger secondary filter media improves particle separation.

It will be appreciated that due to the difference in densi-ties, the primary and second filter media do not mix in the chamber, and the primary filter media sits above the sec-ondary filter media.

In operation the secondary filter media act as a particulate filter thereby trapping particulate matter that is present in the water. This trapped matter is held until the filter is back-washed, and which time the particulate matter rises to the surface of the water in the filter and can be mechanically removed. Such secondary filter media can beneficially trap particulate material as small as 4 microns. The primary filter acts to control the phosphate levels in the water. In a preferred embodiment the beads 114 are at least partially coated with a bacterial culture.

The system may further comprise an oxygenator for oxygenating the water. This reduces the possibility of reduced dissolved oxygen levels in the water (i.e. less than 8 ppm) which may be caused by algae growth and may result in the growth of dangerous anaerobic bacteria. For this reason, the water is preferably oxygenated to ensure dis-solved oxygen levels of between 8-11 ppm, even more preferably 8-10 ppm. The reason for this is to optimise biofilm health within the filter, especially when the water is heated to high temperatures (over 25 deg C.) or the pool is covered for long periods of time.

The water filtration system may comprise a monitoring system such as a water flow rate and/or pressure sensor for monitoring the water pressure and/or flow rate and control one or more operational parameters based on the output from the monitoring system. The operational parameter controlled may comprise the water flow rate through modi-fying the pump speed. Alternatively the operational param-eter may be to trigger a backwash operation for example in the event the pressure has increased to a predetermined value.

The system comprises a management system for control-ling the pump and therefore water flow rate through the system. The contaminant removal can therefore be con-trolled. Control can also be made of valves in the system.

Experimental Results

The microbiological safety of the water after remediation is key to the present invention, meaning there must be careful control of bacteria and pathogens without the requirement for traditional chemical disinfection such as chlorine, salt or ozone. Chlorination is highly effective at eliminating microorganisms in water. However, chlorine has negative effects to human health, resulting from the by-products formed as it attacks organic material in the water. Therefore, the present invention eradicates this risk however it is necessary to ensure management of pathogens. The following experimental data and results establish levels for the microbiological safety.

Testing was performed with a high microbial loading of faecal microorganisms into a test swimming pool.

Results in graph 1 show the effect over time of concen-tration of faecal coliform bacteria where the level of such bacteria is a good indicator of the ability of the filter to remove potential pathogenic bacteria. For drinking water, the concentration of faecal coliform bacteria must be zero. The effectiveness of the system is shown in three plots, where the first plot shows first and second filters in an operational state together with UV treatment operational, the second plot shows the filters in an operational state and UV treatment off, and the third plot shows the filters and UV treatment in a non-operational state. It is clear that a sig-nificant reduction in concentration of faecal coliform is present when the filters are operational and further where the UV treatment is operational.

Graph 2 is a similar plot to graph 1 showing the effect on high dosing of *Escherichia coli* which can be found in the intestine of humans and animals and can therefore give an indication to the microbial quality of water. Again results show a significant effect on the presence of *Escherichia coli* with filters operational and further with UV treatment operational.

Graph 3 is a similar plot to graphs 1 and 2, showing the effect on high dosing of enterococci. Enterococci are commonly used in combination with *E. coli* to assess the microbial quality of water. A specific species of enterococci is *E. faecalis* which is part of the normal gut microflora and can cause gastrointestinal and dermatological illnesses that correlate with their concentration in water can be used in the laboratory as a model *enterococcus*. Enterococci are found in high concentrations in human faeces, usually between 104 and 106 bacteria per gram wet weight. Moreover, concentrations of enterococci are a better microbiological indicator of whether water is fit for bathing in and may replace coliform concentrations as the basis for official standards. Graph 3 shows the increasing effect of the operational configuration of the filters and UV on reduction in concentration of enterococci.

Graph 4 represents the each of graphs 1-3 on a single plot showing the concentration of each of coliform bacteria, *Escherichia coli* and enterococci as influent (without remediation), activation of the filter (biofilter), with activation of a secondary filter in the system (adsorber filter) and finally with the addition of UV treatment. The horizontal lines show an upper EU freshwater limit for *E. coli*, the intermediate horizontal line shows the EU freshwater limit for enterococci, and the lower line shows the upper limit aimed for by the present invention. The last point where a biofilter, secondary filter and UV treatment are all activated shows zero concentration for each of coliform bacteria, *Escherichia coli* and enterococci, meaning compliance for safe drinking water.

To control these pathogens that may be present in water to be remediated, as described throughout this document the present invention controls nutrient levels, removing for example nitrogen, phosphate and carbon from the water to almost zero concentration. Nutrient removal to this degree creates an environment that controls the growth of algae and pathogenic bacteria. Utilising a biofilter, this approach attracts species of better adapted natural bacteria to the biofilter. These natural bacteria then remove nutrients from the water that creates an environment deadly to pathogenic bacteria.

A further experiment has been devised showing the process pathogens go through comparing a control system with the present invention. A common pathogenic species of bacteria, *Escherichia coli* was modified to emit light, this was then seeded in the mechanical nutrient removing arrangement (filter) and the time taken for the filter to consume the special bacteria was measured. The results as presented in FIG. 3 demonstrate, in real time, the ability to control the light emitting bacteria *Escherichia coli*. The lower four squares show no light where the bacteria are being constantly destroyed as the activity is low according to the present invention, and there is no change in colour to pink over time indicative of increased bacterial activity. In the upper four squares in a control system however there is a significant change where the colour turns pink indicating bacteria in the control filter running rampant as the time increases. After three hours there is significant bacterial activity. It is clear that the activity of the *E. coli* is significantly slashed by the remediation system and method according to the present invention.

Figure 4:
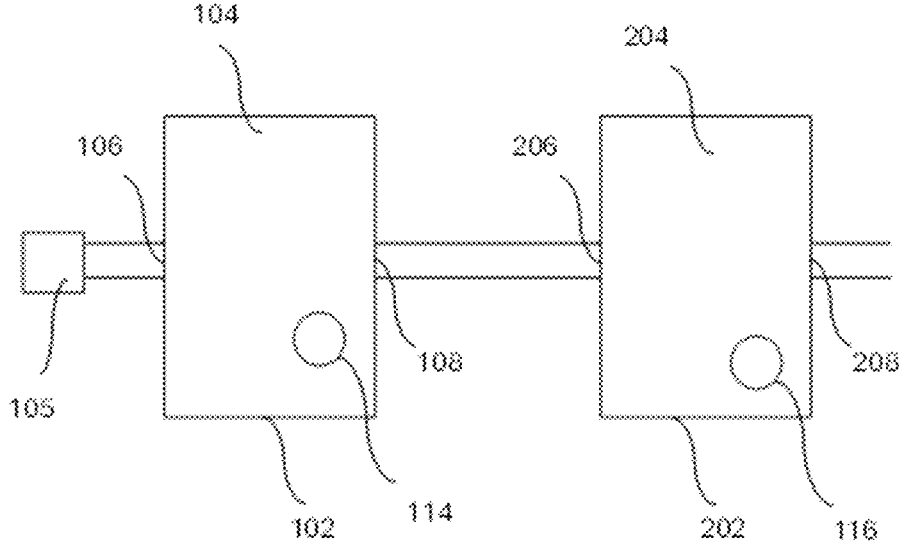
FIG. 4 is a schematic representation of a first filter in fluid communication with a second filter according to an illustrative embodiment of the present invention.

Referring to FIG. 4, a second filter is shown in fluid communication with a first filter. The second filter comprises a further housing 202 having a water inlet 206 and an outlet 208. The further housing 202 defines a further filtration chamber 204 therein. The filter media in the first filtration chamber comprises primary filter media 114, and the secondary filter chamber 204 further comprises a plurality of secondary filter media 116 therein, different to the primary filter media 114.

Aspects of the present invention have been described by way of example only and it will be appreciated to the skilled addressee that modifications and variations may be made without departing from the scope of protection described herein.

The invention claimed is:

1. A water filtration system comprising:
a pressure biofilter comprising a housing having a water inlet and an outlet, the housing having chamber walls defining a first filtration chamber therein, the first filtration chamber having filter media therein comprising a plurality of at least partially porous ceramic filtration beads having exposed ceramic interior surfaces; and
a pump for pumping water to the inlet;
wherein
the ceramic beads have a dry average material density of 0.1 to 1.2 kg/litre;
the ceramic beads are substantially spherical;
the ceramic beads are unconstrained within the filtration chamber; and
the ceramic beads are hydrophilic.

2. The water filtration system according to claim 1, further comprising a sealed flow path defined between the pump and the filtration chamber.

3. The water filtration system according claim 1, wherein the inlet comprises an inlet port, the inlet port coupled to the pump.

4. The water filtration system according to claim 1, wherein the outlet comprises an outlet port.

5. The water filtration system according to claim 1, wherein each of the plurality of beads is porous through the entire bead.

6. The water filtration system according to claim 1, wherein the beads have a dry average material density of 0.2 to 0.5 kg/litre.

7. The water filtration system according to claim 1, wherein the beads comprise a diameter of between 10-30 mm.

8. The water filtration system according to claim 1, further comprising a second filter in fluid communication with the pressure biofilter, the second filter comprising a further housing having a water inlet and an outlet, the further housing defining a secondary filtration chamber therein, wherein the filter media in the first filtration chamber comprises primary filter media, and the secondary filtration chamber comprises a plurality of secondary filter media therein different to the primary filter media.

9. The water filtration system according claim 8, wherein the secondary filter media comprise a plurality of substantially non-porous filtration media.

10. The water filtration system according claim 8, wherein the secondary filter media comprises silicate.

11. The water filtration system according claim 8, wherein the density of the secondary filter media is greater than the primary filter media.

12. The water filtration system according claim 1, wherein the beads are at least partially coated with a bacterial culture.

* * * * *